(12) United States Patent
Yan

(10) Patent No.: US 9,075,510 B1
(45) Date of Patent: Jul. 7, 2015

(54) ALIASES WITHIN A GRAPHICAL MODEL OF A DESIGN

(71) Applicant: THE MATHWORKS, INC., Natick, MA (US)

(72) Inventor: Ying-On Yan, Lexington, MA (US)

(73) Assignee: The MathWorks, Inc., Natick, MA (US)

( * ) Notice: Subject to any disclaimer, the term of this patent is extended or adjusted under 35 U.S.C. 154(b) by 132 days.

(21) Appl. No.: 13/735,504

(22) Filed: Jan. 7, 2013

Related U.S. Application Data

(63) Continuation of application No. 12/405,014, filed on Mar. 16, 2009, now Pat. No. 8,365,141.

(60) Provisional application No. 61/140,544, filed on Dec. 23, 2008.

(51) Int. Cl.
*G06F 9/44* (2006.01)
*G06F 9/45* (2006.01)
*G06F 3/0484* (2013.01)

(52) U.S. Cl.
CPC .............. *G06F 3/0484* (2013.01); *G06F 8/30* (2013.01); *G06F 8/20* (2013.01); *G06F 8/34* (2013.01)

(58) Field of Classification Search
CPC .............. G06F 8/30; G06F 8/20; G06F 8/36; G06F 8/34; G06F 3/0484
See application file for complete search history.

(56) References Cited

U.S. PATENT DOCUMENTS

| | | | |
|---|---|---|---|
| 5,555,201 A | 9/1996 | Dangelo et al. | |
| 5,623,418 A | 4/1997 | Rostoker et al. | |
| 6,690,981 B1 * | 2/2004 | Kawachi et al. | 700/83 |
| 6,971,084 B2 | 11/2005 | Grey et al. | |
| 7,281,236 B1 | 10/2007 | Galvin et al. | |
| 7,464,373 B1 * | 12/2008 | Yunt et al. | 717/125 |
| 7,540,268 B2 * | 6/2009 | Lewis et al. | 123/179.5 |
| 7,574,690 B2 | 8/2009 | Shah et al. | |
| 7,650,574 B2 | 1/2010 | Nattinger | |
| 7,788,642 B2 * | 8/2010 | Sohm et al. | 717/125 |
| 7,840,937 B1 * | 11/2010 | Chiluvuri | 717/106 |
| 7,904,876 B1 * | 3/2011 | Critz | 717/104 |
| 8,381,187 B2 * | 2/2013 | Fowler et al. | 717/125 |
| 8,392,873 B2 * | 3/2013 | Agrawal et al. | 717/104 |
| 2001/0034881 A1 | 10/2001 | Washington | |
| 2002/0083413 A1 * | 6/2002 | Kodosky et al. | 717/109 |
| 2002/0184610 A1 * | 12/2002 | Chong et al. | 717/109 |
| 2005/0039162 A1 | 2/2005 | Cifra | |
| 2005/0155014 A1 * | 7/2005 | Andrade et al. | 717/105 |
| 2005/0268288 A1 | 12/2005 | Nattinger | |
| 2006/0095892 A1 * | 5/2006 | Banavar et al. | 717/109 |
| 2006/0143570 A1 | 6/2006 | Washington et al. | |
| 2006/0168557 A1 * | 7/2006 | Agrawal et al. | 717/104 |

(Continued)

OTHER PUBLICATIONS

Springer, Graphical modes, 2006, pp. 360-377.*
Duanqing Wu, A Graphical User Interface for Editing Formal Specification Objects, 2001, pp. 1-14.*
Jose Sanchez, The Learing of Control Concepts Using Interactive Tools, 2004, pp. 84-91.*

(Continued)

*Primary Examiner* — Thuy Dao
*Assistant Examiner* — Mongbao Nguyen
(74) *Attorney, Agent, or Firm* — Harrity & Harrity, LLP

(57) ABSTRACT

Blocks in a graphical model of a system may be assigned aliases. A user may interact with the aliases. In one implementation, a method may include displaying the alias in a view of the model that does not include the block associated with the alias and modifying, in response to user interaction with the alias, a graphical view of the model or properties of the block associated with the alias.

20 Claims, 10 Drawing Sheets

(56) References Cited

U.S. PATENT DOCUMENTS

| | | | |
|---|---|---|---|
| 2006/0225034 A1 | 10/2006 | Peck et al. | |
| 2006/0259871 A1* | 11/2006 | Washington et al. | 715/763 |
| 2007/0044078 A1 | 2/2007 | Cifra | |
| 2007/0150859 A1* | 6/2007 | Kodosky et al. | 717/106 |
| 2007/0261024 A1 | 11/2007 | Kodosky et al. | |
| 2008/0263521 A1 | 10/2008 | Neumann et al. | |
| 2009/0083702 A1* | 3/2009 | Eichenberger et al. | 717/109 |
| 2009/0089741 A1 | 4/2009 | Bornhoevd et al. | |
| 2010/0017788 A1 | 1/2010 | Bronkhorst et al. | |

OTHER PUBLICATIONS

Co-pending U.S. Appl. No. 12/405,014, filed Mar. 16, 2009 entitled "Aliases Within a Graphical Model of a Design" by Ying-On Yan, 48 pages.

Begel, "A Graphical Programming Language for Interacting with the World," 1996, pp. 10-20.

Lin, "A Flexible Graphical User Interface for Performance Modeling," Software-Practice and Experience, 1995, pp. 196-200.

Wu, "A Graphical User Interface for Editing Formal Specification Objects," The Pennsylvania State University, 2001, pp. 3-11.

* cited by examiner

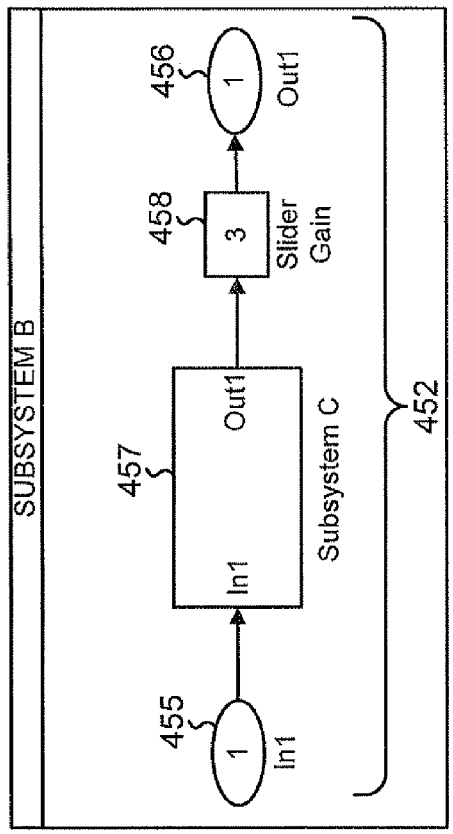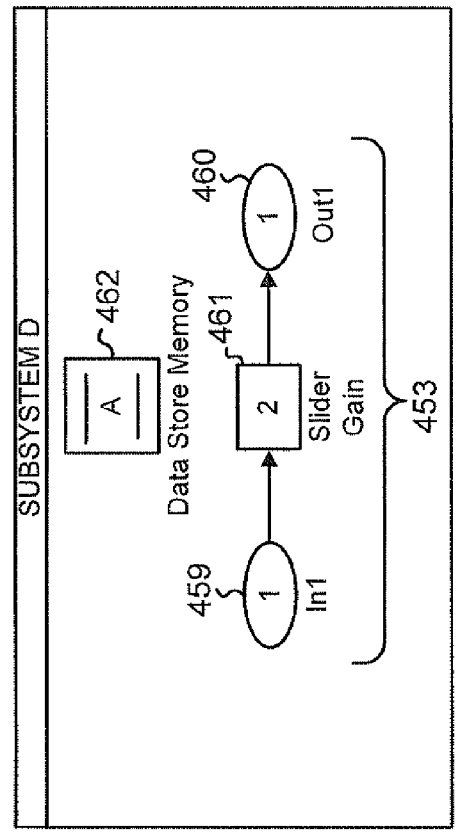

ALIASES WITHIN A GRAPHICAL MODEL OF A DESIGN

PRIORITY INFORMATION

The present application is a continuation of U.S. patent application Ser. No. 12/405,014, filed Mar. 16, 2009, which claims priority to U.S. Provisional Patent Application No. 61/140,544, filed Dec. 23, 2008, the entire contents of these applications are hereby incorporated by reference.

BACKGROUND

Technical computing environments are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks such as research and product development.

Existing technical computing environments may be implemented as or run in conjunction with a graphically-based modeling environment. For example, in one existing graphically-based modeling environment, graphical simulation tools allow models to be built by connecting graphical blocks, where each block may represent an object associated with functionality and/or data. The technical computing environment and the graphically-based modeling environment may be a single, integrated application. Alternatively, the two may in some way be combined or linked with one another to present a graphical interface to the user.

Models generated with graphical modeling tools may be in part or completely directly converted to computer code by or from the graphical modeling tool. The generated computer code can then be executed in the target environment. For example, a model of a control system for an automobile may be graphically developed with the graphical modeling tool, implemented as code, and then deployed in an embedded system in the automobile.

Blocks in the graphical model may be hierarchical in the sense that each block itself may be implemented as one or more blocks. A user may, for instance, view the model at a high level, then select blocks to traverse the model hierarchy downward to see increasing levels of model detail. Each hierarchical level may be thought of as a different subsystem of the model. When working with complex models that include many subsystems, a user may spend significant time navigating back and forth between the subsystems of the model.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A-4E are diagrams illustrating an exemplary graphical model;

DETAILED DESCRIPTION

Figure 1:
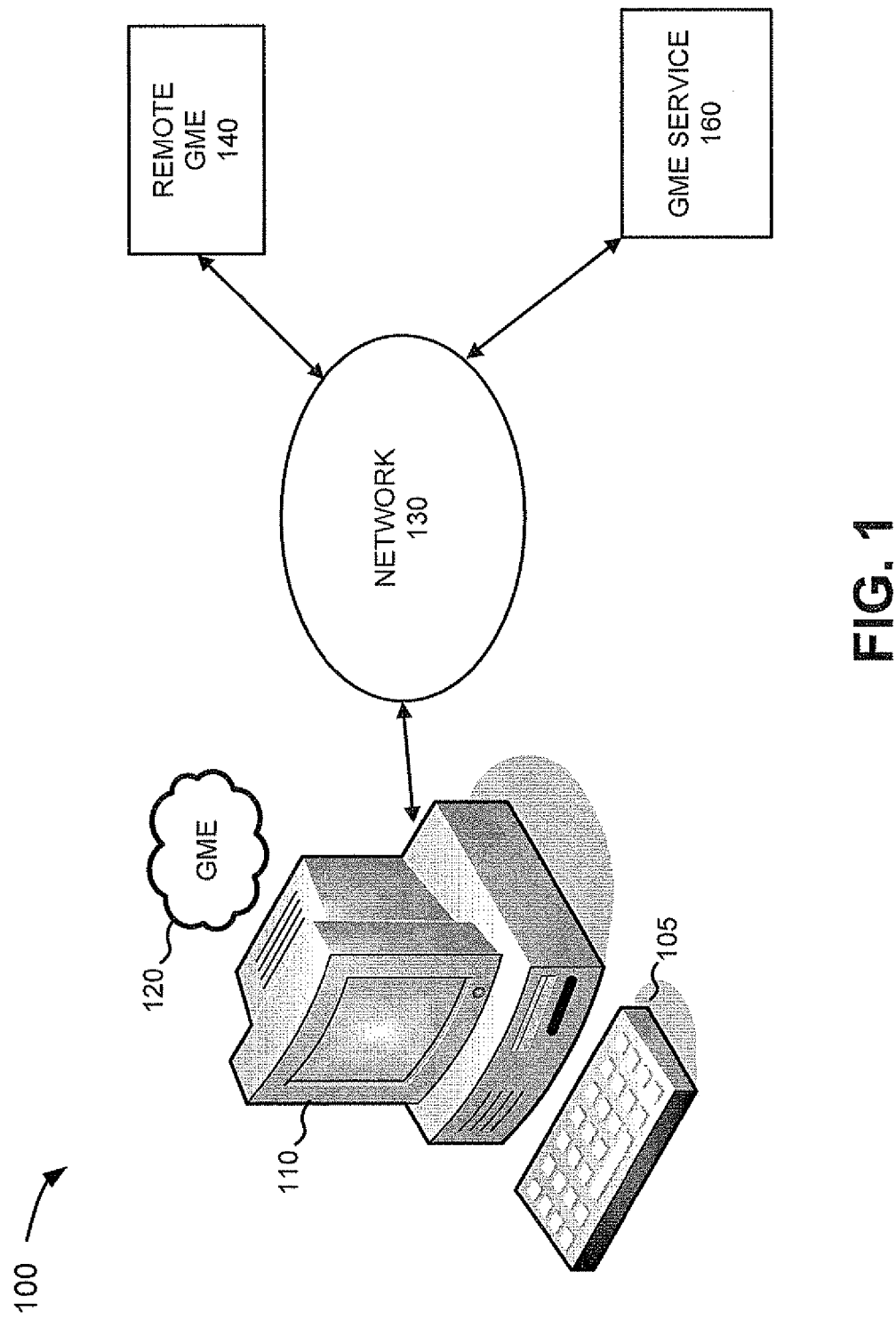
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

Overview

Implementations described herein relate to a graphical modeling environment in which users may construct graphical models. Blocks in a graphical model may be assigned aliases. The alias for a block in the model may be visible to the user as a graphical indicator shown outside of the subsystem to which the block belongs. Through the alias, the user may, for example, modify, replace, or delete the block corresponding to the alias. Additionally, the alias may be used to allow the user to quickly navigate to the subsystem to which the block belongs. In this manner, graphical aliases may be used to improve the usability of the graphical modeling environment.

DEFINITIONS

A Technical Computing Environment (TCE) may include any hardware and/or software based logic that provides a computing environment that allows users to perform tasks related to disciplines, such as, but not limited to, mathematics, science, engineering, medicine, and business. The technical computing environment may include a text-based facilities (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

The TCE may be integrated with or operate in conjunction with a graphical modeling environment (e.g., Simulink®, mentioned above), which may provide graphical tools for constructing models or systems or processes.

In one implementation, the graphical modeling environment may provide this ability using graphical toolboxes (e.g., toolboxes for signal processing, image processing, data plotting, parallel processing, etc.). In another implementation, the graphical modeling environment may provide these functions as block sets. In still another implementation, the graphical modeling environment may provide these functions in another way, such as via a library, etc.

Models generated with the graphical modeling environment may be, for example, models of a physical system, computing system, engineered system, or embedded system.

System Description

FIG. 1 is an exemplary diagram of a system 100 in which concepts described herein may be implemented. The system may include a personal computer or workstation 110. Workstation 110 may execute a graphical modeling environment 120 that presents a user with an interface that enables design, analysis, and generation of, for example, technical applications, engineered systems, and business applications. For example, graphical modeling environment 120 may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, graphical modeling environment 120 may be run by multiple networked computing devices or by one or more remote computing devices. In such an implementation, graphical modeling environment 120 may be executed in a distributed manner, such as by executing on multiple computing devices simultaneously. Additionally, in some implementations, graphical modeling environment 120 may be executed over network 130 in a client-server relationship. For example, workstation 110 may act as a client that communicates with, using a web browser, a server that stores and potentially executes the graphical modeling environment program.

For example, as shown in FIG. 1, system 100 may include a remote graphical modeling environment (GME) 140 (e.g., a remotely located computing device running a graphical modeling environment) and/or a graphical modeling environment service 160. Graphical modeling environment service 160 may include a server computing device that provides a graphical modeling environment as a remote service. For instance, a graphical modeling environment may be provided as a web service. The web service may provide access to one or more programs provided by graphical modeling environment service 160.

Figure 2:
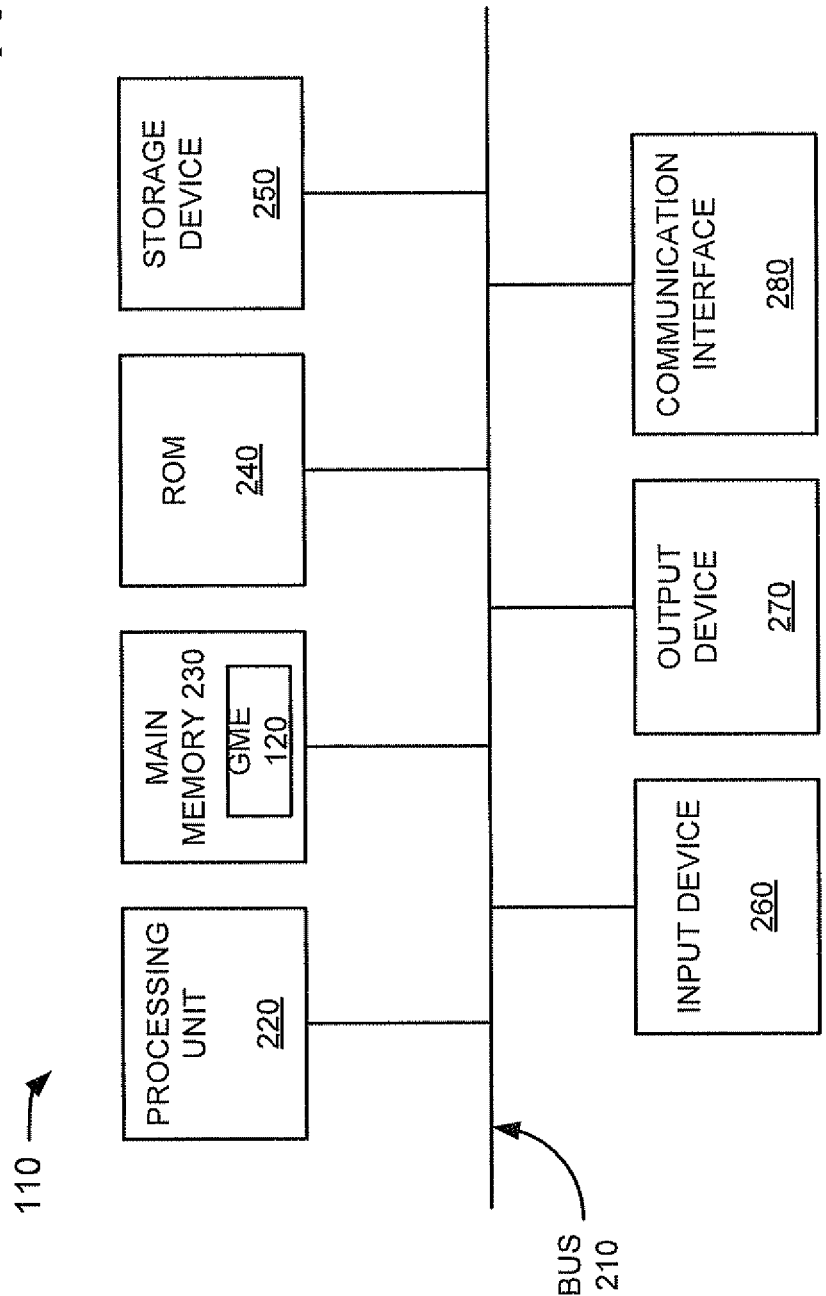
FIG. 2 is a diagram of an exemplary device corresponding to a workstation or remote device as shown in FIG. 1.

FIG. 2 is a diagram of an exemplary device corresponding to workstation 110 or a remote device running remote graphical modeling environment 140 or graphical modeling environment service 160. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as Flash-based memory.

Input device 260 may include a mechanism that permits an operator to input information to workstation 110, such as a keyboard 105, a mouse, a pen, a single- or multi-point touch interface, an accelerometer, a gyroscope, a microphone, voice recognition and/or biometric mechanisms, etc. Output device 270 may include a mechanism that outputs information to the operator, including a display, a printer, a speaker, etc. In this case of a display, the display may be a touch screen display that acts as both an input and output device. Input device and/or output device 270 may be haptic type devices, such as joysticks or other devices based on touch.

Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. For instance, workstation 110 may implement GME 120 by executing software instructions from main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of workstation 110, in other implementations, workstation 110 may contain fewer, different, or additional components than depicted in FIG. 2. In still other implementations, one or more components of workstation 110 may perform one or more tasks performed by one or more other components of workstation 110.

Graphical Modeling Environment

Figure 3:
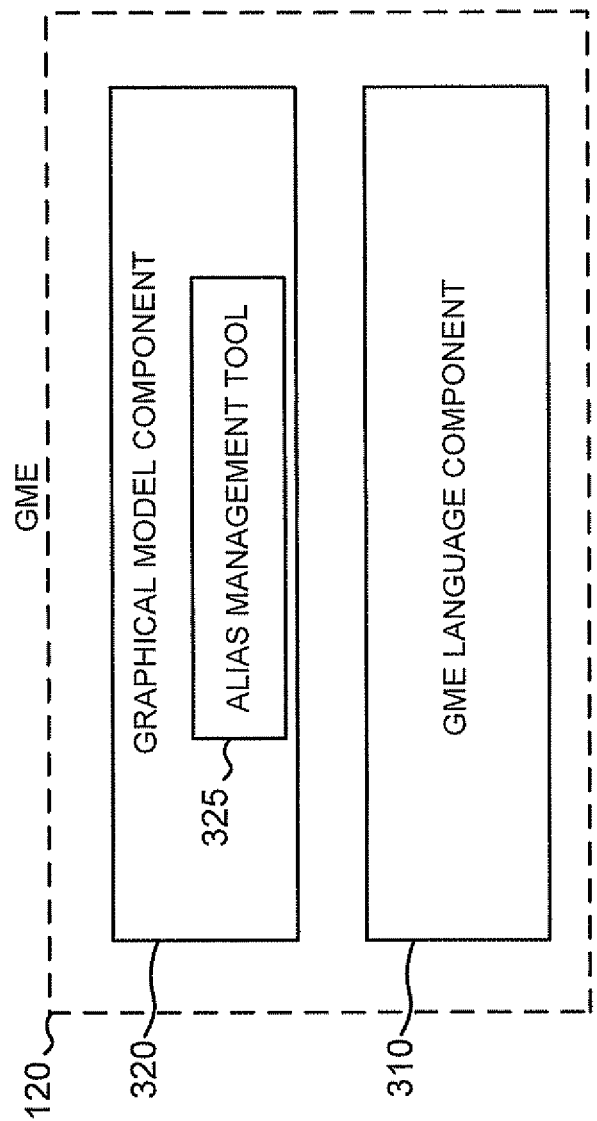
FIG. 3 is a diagram illustrating functional components of an exemplary technical computing environment (TCE)

FIG. 3 is a diagram illustrating functional components of GME 120. As mentioned, GME 120 may include a program stored on a computer-readable medium, such as main memory 230 or ROM 240 in workstation 110. In other implementations, GME 120 may be associated with another device separate from workstation 110, and may accessed by workstation 110 via communication interface 280 and a network (e.g., network 130). In yet other implementations, all or part of GME 120 may be implemented in hardware.

GME 120 may include a GME language component 310 and a graphical model component 320. GME language component 310 may generally function to implement a technical computing language.

Graphical model component 320 may include software for modeling, simulating, and/or analyzing dynamic systems. Graphical model creation component 320 may, for instance, support linear and nonlinear systems, models in continuous time, sampled time, discrete-event based, or a combination. Sampled time systems, in particular, may refer to discrete systems that operate at one or more rates. Some blocks in a sampled time system may inherit their sample rate based on inference rules that consider aspects of the block use, for example, by propagation of a sampling rate forward or backward in a model. These inference rules may account for continuous sample rates as well, that may be used to indicate a block operates as part of a continuous-time model. Blocks that operate in continuous time may be further considered as partaking in computations during minor time steps or not. A minor time step is an evaluation of a numerical integration scheme, such as, for example, a multi-phase integration scheme, at a point in logical time that is used to compute an accepted new state of the model at the next major time step. The values computed at minor time steps may not be presented to the user. Systems modeled with graphical model component 320 may be constructed using a graphical interface that allows the user to arrange blocks that represent functionality and/or data. Graphical model component 320 may additionally allow users to execute or run the created model and to view and analyze results of the model.

The systems modeled with graphical model component 320 may include components (e.g., blocks) that provide for the conversion of data types within the model. For instance, a "data type conversion" block may provide for the conversion of the data type of an input signal to a different data type for the output signal based on a parameter set for the block. A "data type conversion inherited" block (or block property, signal property, port property, etc.) may similarly provide for the conversion of data types within a model by converting the data type of an input or output signal to the data type of a reference signal that is also connected to the block as input or output so that the data type of the signal that is converted is "inherited" from the reference signal. Inheriting the data type of a reference signal from another model block can provide advantages such as making the reuse of existing models easier. Data type inheritance may be an intrinsic aspect of any block and allow for user configuration. For example, the data type of the output of a block may be inferred from the data type of the input or other output. Likewise, the data type of the input may be inferred from the output.

The above paragraph discussed conversion of signals having a particular "data type." More generally, the conversion may be performed based on properties of a signal, such the data type (e.g., fixed-point data type, floating-point data type, integer data type, etc.), the sample rate of the signal, the complexity of the signal (real or imaginary signal), the computational causality of the signal, or the dimensionality of the signal.

Regarding a fixed-point data type, the term "fixed-point representation" or "fixed-point data type" may refer to a method for representing numerical values and data types that have a set range and precision. Fixed-point numbers can be represented as a real-world value=SQ+B, where S is the slope, Q is an integer that encodes the real-world value, and B represents a bias. S can be expressed as $F*2^E$, where F is a slope adjustment factor set between 1 and 2, and $2^E$ specifies the binary point, where E is the fixed power-of-two exponent.

The slope and the bias together represent the scaling of the fixed-point number. Fixed-point data types can be defined by their word length, their fraction length, and whether they are signed or unsigned.

Fixed-point data types may be integers, fractions, or general fixed-point numbers. One of the differences between fixed-point and floating-point data types is the default binary point, which is the means by which fixed-point numbers are scaled. A fixed-point number may be encoded in a computer using the slope-bias encoding scheme discussed in the previous paragraph.

In general, graphical model component 320 can be used to graphically generate models that simulate the behavior of a design. The models may be used to facilitate communication, peer-review, and iterative refinement with visual representations that simplify understanding. The models may be refined so the design incorporates increasing implementation detail. Also, the implementation may be automatically generated from the models. The automatic generation may account for target implementation information such as hardware characteristics as well as, for example, optimization options such as loop unrolling, expression folding, inlining, outlining etc.

When viewing a model via graphical model component 320, users may choose to display only certain portions of the model at any particular time. For example, a model may be made of many subsystems. Users may find it convenient to only work on a single subsystem at any particular time. Alias management tool 325 may facilitate the creation and manipulation of aliases for blocks within a model. As will be described in more detail below, an alias for a block may provide for a convenient way for users to navigate through or modify blocks in different subsystems in the model. In general, an alias may be a graphical representation of a block, or aspects of a block, that is displayed in a graphical view of a model that is different than the view in which the block is shown. Users can interact with the graphical alias to perform operations related to the block.

Graphical modeling component 320 may allow a model to be graphically displayed in a number of representations or views. For instance, although a block diagram view is generally described herein, other views such as an object diagram view, a sequence diagram view, or a scenario diagram view could be presented to the user. An alias for a block or aspects of a block in one view may be displayed in a different view.

Although alias management tool 325 is shown as a separate component of graphical model component 320, in some implementations, alias management tool 325 may be tightly integrated within GME 120 or graphical model component 320.

Before describing alias management tool 325 in additional detail, it will be helpful to describe an exemplary model generated with graphical model creation component 320.

FIGS. 4A-4E are diagrams illustrating exemplary graphical interfaces showing views of a graphical model. The model shown in FIGS. 4A-4E may have been generated using graphical model component 320.

Figure 4A:
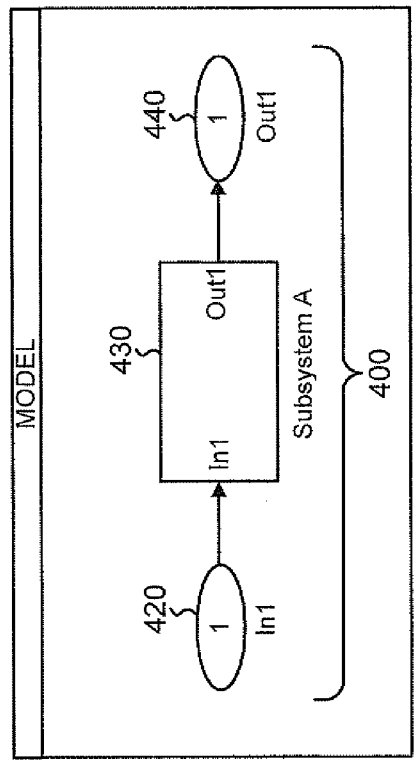

A model may be represented by a number of graphical blocks or nodes. In FIG. 4A, a model 400 is illustrated in graphical model window 410. Model 400 represents only one example of a model that may be generated using graphical model creation component 320. Many different models, or types of models, may be generated using graphical model creation component 320.

A user may select graphical elements that represent nodes of model 400, called blocks herein, and place the blocks in model window 410. For example, a user may select a block from a block library and may move the block into model window 410 using a pointing device, such as a mouse. A block may represent functionality and/or data and may be defined using any of a number of possible programming languages. A block may also itself be defined by one or more other blocks.

In the example of FIG. 4, model 400 represents a model having an input block 420 ("In1") connected to subsystem block 430 ("subsystem A"), which generates an output that is input to output block 440 ("Out1"). Subsystem A 430 may itself include a number of additional functional blocks or subsystems. For exemplary model 400, hierarchical layout 450 illustrates the hierarchy of subsystems that make up model 400. As shown, subsystem A includes subsystem B and subsystem D, where subsystem B further includes subsystem C. In other words, subsystem B and D are members of subsystem A. Similarly, subsystem C is a member of subsystems B and A.

Blocks 420, 430, and 440 of model 400 may represent elements from which model 400 is built. Model 400 may have been partially or completely generated by a user placing each of blocks 420 through 440 in model area 400, connecting inputs and outputs of the blocks to create logical connections between the blocks, and configuring parameters relating to the blocks. Subsystem A 430, in particular, may have been generated by the user grouping, through graphical model component 320, the blocks into sets of blocks as a subsystem. In some situations, blocks or subsystems may also be partially or completely generated automatically.

FIGS. 4B-4E are diagrams of additional graphical model windows illustrating the details of the subsystems for model 400.

Figure 4B:
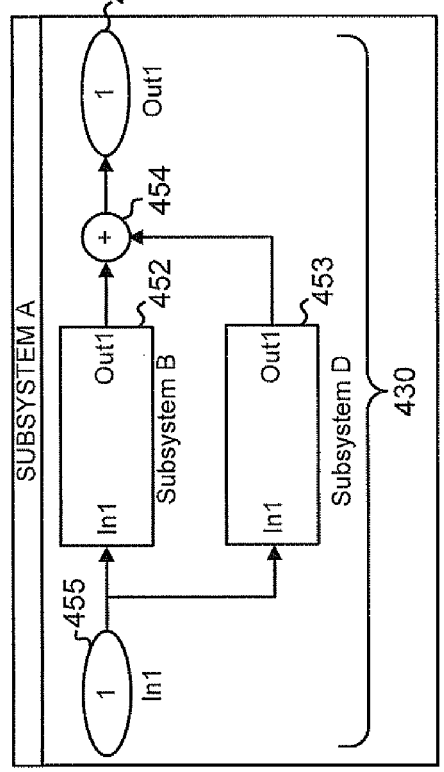

FIG. 4B is a diagram illustrating, within a model window 411, subsystem A 430 of model 400. Subsystem A 430 includes an input block 455 ("In1") and an output block 451 ("Out1"). Additionally, subsystem A 430 includes two additional subsystems: subsystem B 452 and subsystem D 453. The output of subsystem B 452 and subsystem D 453 are summed by sum block 454 and the result is input to the output block 451.

FIG. 4C is a diagram illustrating, within a model window 412, subsystem B 452 of model 400 in additional detail. Subsystem B 452 includes an input block 455 ("In1") and an output block 456 ("Out1"). Additionally, subsystem B 452 includes an additional subsystem, subsystem C 457. The output of subsystem C 457 is the input of slider gain block 458, the output of which is input to output block 456. Slider gain block 458 may be a block that multiplies it input by an adjustable gain.

FIG. 4D is a diagram illustrating, within a model window 413, subsystem D 453 of model 400 in additional detail. Subsystem D 453 includes an input block 459 ("In1") and an output block 460 ("Out1"). Additionally, subsystem D 453 includes a slider gain block 461 and a data store memory block 462. Slider gain block 461 may be a block used to provide an adjustable gain to the output of block 459. Data store memory block 462 may function as a memory store that is available to other blocks in the model. Unlike model windows 410-412, model window 413 does not include additional subsystems. The blocks in model window 413 may instead be blocks that provide a primitive level of functionality.

Figure 4E:
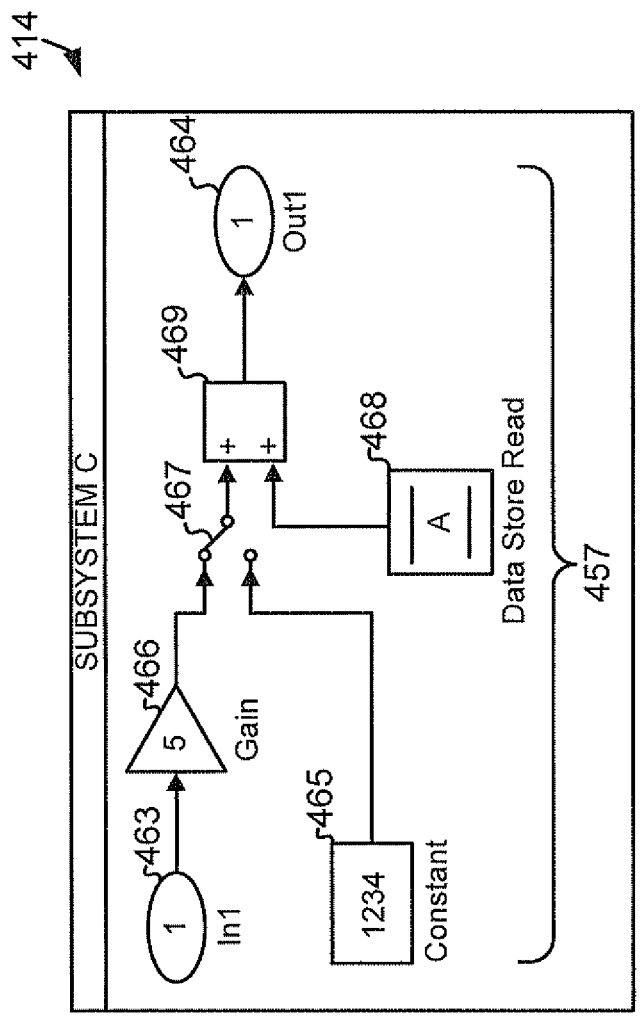

FIG. 4E is a diagram illustrating, within a model window 414, subsystem C 457 of model 400 in additional detail. Subsystem C 457 includes an input block 463 ("In1") and an output block 464 ("Out1"). Additionally, subsystem C 457 includes a number of other blocks: a constant block 465, a gain block 466, a manual switch block 467, a data store read block 468, and a sum block 469. Constant block 465 provides a constant output value to switch 467. Gain block 466 may be a block used to provide a gain to the output of block 463. Data store read block 468 functions to read from a data store memory block, such as data store memory block 462 (FIG. 4D), the contents of which are output to sum block 469. Model window 414, like model window 413, does not include additional subsystems.

When working with model 400, a user may frequently switch between the various model windows 410-414 that show the different views of model 400. For example, a user may have multiple different ones of model windows 410-414 open on the desktop or main graphical interface within graphical model component 320 of GME 120. Alternatively or additionally, the user may frequently change the view of one of model windows 410-414 to another of model windows 410-414. Such actions may require a lot of user interactions, such as "clicking," "double-clicking," etc. to navigate through the various elements of the model. For example, if a user is in top level window 410 and would like to access manual switch block 467 and slider gain block 458, the user may need to double-click a number of times to get to the desired blocks. This can potentially be inefficient and frustrating for the user. The reuse of one area on the screen to display each window in response to user interaction may not resolve this problem.

A "model window," as used herein, may correspond to a "window" under an operating system such as the Windows series of operating systems from Microsoft, Corp. Alternatively, multiple model windows may be displayed in a single operating system window.

Alias Management Tool

As previously mentioned, alias management tool 325 may assist users in navigating to or modifying blocks in a model using graphical aliases. This can be particularly useful when working with models that have a number of hierarchical levels, such as model 400 (FIG. 4).

Figure 5:
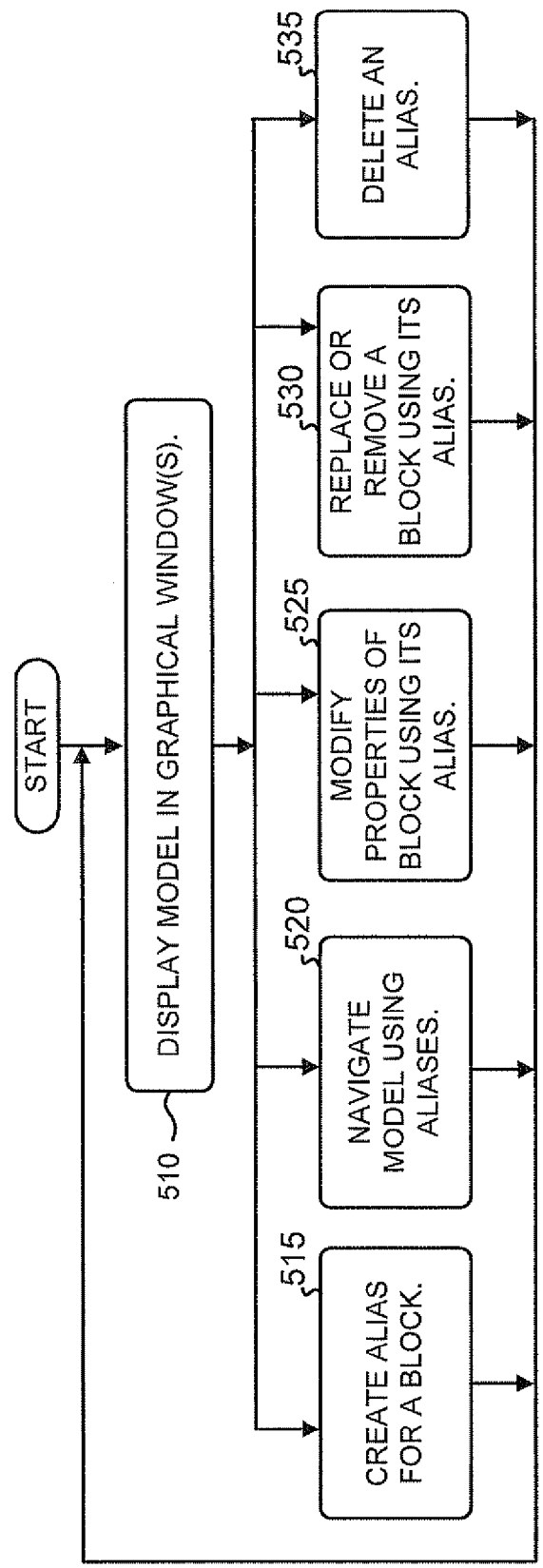
FIG. 5 is a flow chart illustrating exemplary operations relating to the use of graphical aliases in a model.

FIG. 5 is a flow chart illustrating exemplary operations relating to the use of graphical aliases in a model.

A user may begin by viewing a model displayed by graphical model component 320 in one or more graphical windows (act 510), such as model windows 410-414. At some point, the user may wish to perform operations relating to graphical aliases. A number of possible operations are shown in FIG. 5. These include: create an alias for a block (act 515), navigate through a model using an alias (act 520), modify properties of a block using its alias (act 525), replace or remove a block using its alias (act 530), and delete an alias (act 535). These operations may be performed by the user interacting with alias management tool 325 and/or with graphical model component 320.

Figure 6A:
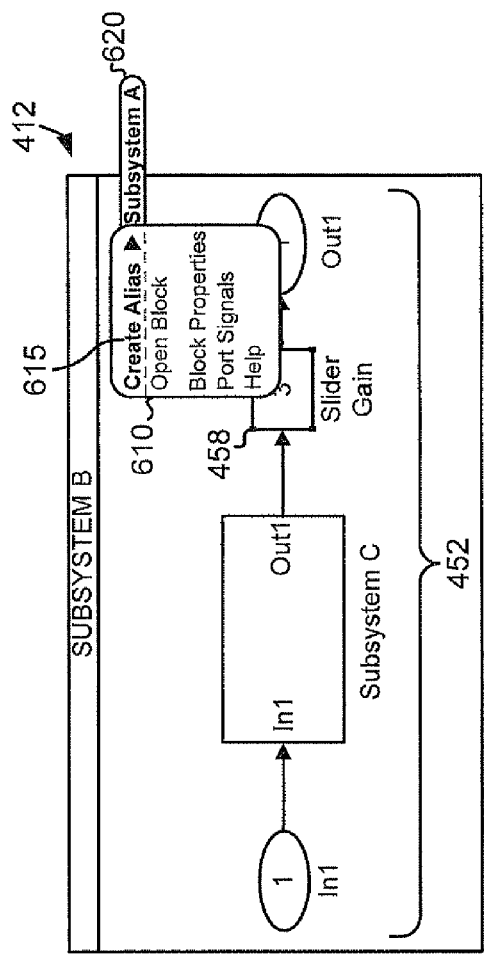
FIG. 6A is a diagram illustrating an exemplary user interface through which a user may create a graphical alias.

FIG. 6A is a diagram illustrating an exemplary user interface through which a user may create a graphical alias, as performed in act 515. In general, alias management tool 325 may allow a user to create an alias in a number of possible ways. For example, a user may create a graphical alias through a menu command, a command entered via a keyboard, or a command entered via a mouse selection. As shown in the example of FIG. 6A, a graphical alias may be created by using a mouse to select or open the contextual menu for a block in a model (e.g., by "right-clicking" on a block). In this example, the user is currently viewing subsystem B 452 in model window 412. Assume that the user would like to create a graphical alias for slider gain block 458. The user may right-click on slider gain block 458 to bring up menu 610 for block 458.

An alias created for a block may correspond to a particular instance of a block or to the type level definition of the block. Thus, two different instances of a slider gain block (i.e., two different slider gain blocks in a model) may each have an alias created for it. Further, an alias may be created for a primitive (low level) block or a block that represents a hierarchy of blocks. Further, in some implementations, multiple aliases may be created for a block.

Menu 610 may include some or all of the "normal" options associated with block 458. For example, menu 610 may include options to open the block, view the properties of the block, change port signals associated with the block, or obtain help relating to the block. Additionally, a "create alias" menu item 615 may be shown to the user. Create alias menu item 615, when selected, may display location menu 620, which lists possible locations where the user may want the alias displayed. As illustrated, location menu 620 particularly lists the location for "Subsystem A." If the user selects "Subsystem A," a graphical alias for slider gain block 458 may be created and associated with subsystem A.

Although only one location is shown in location menu 620, more generally, a plurality of possible locations may be shown in location menu 620. In one implementation, the possible selections displayed in location menu 620 may be generated by alias management tool 325 based on a number of factors. The factors may include, for example, the location of the block (e.g., slider gain block 458) in the hierarchy of the model; the type and properties of the block; global rules configurable by the user; and/or local rules that may override global rules for certain user-specified subsystems/blocks. In the example shown in FIG. 6A, the rule used to populate location menu 620 may have been "all subsystems above the current subsystem in the model hierarchy." The alias may also be created in a different view of the model or a different model. The alias may be associated with the model, for example, in a dialog that may appear when the model is used in a particular mode (e.g., stand-alone execution or referenced from another model).

Figure 6B:
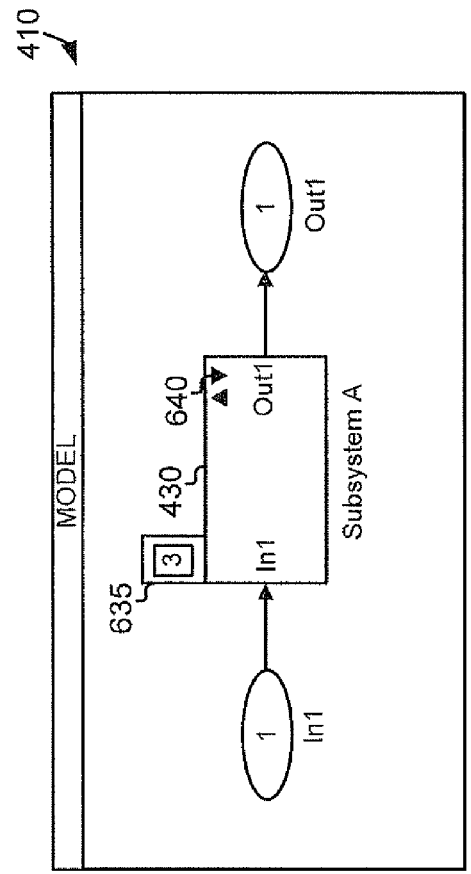
FIG. 6B is a diagram illustrating an exemplary model window after a subsystem in the model is associated with a graphical alias.

Assume that the user creates an alias for slider gain block 458 and indicates that the alias should be located in subsystem A, such as by selecting subsystem A from location menu 620. Alias management tool 325 may then associate a graphical indicator (alias) with subsystem A. FIG. 6B is a diagram illustrating model window 410 (FIG. 4A) after subsystem A is associated with a graphical alias. As shown, subsystem A 430 includes a graphical alias 635 and graphical buttons 640 for controlling the view of graphical alias 635.

Graphical alias 635 may generally include any graphical representation associated with a particular block (i.e., subsystem 430 in FIG. 6B) that indicates that an alias has been associated with the block. In one implementation, a reduced size or thumbnail version of the original block may be used as the graphical alias. Multiple graphical aliases may be associated with a single block. For example, in addition to slider gain block 458, another block (such as one from subsystem C) may also be shown as a graphical alias associated with subsystem A 430.

Graphical buttons 640 may be buttons used to control whether aliases are shown. For example, by pressing the "down" arrow of graphical buttons 640, graphical alias 635 may be removed or otherwise hidden from the user's view. Graphical buttons 640 may only be displayed with blocks that have aliases associated with them. Thus, a block with no associated aliases may not display any graphical buttons 640. Pressing the "up" arrow of graphical buttons 640 may reveal any hidden graphical alias. In this manner, the user may easily toggle between viewing and not viewing graphical aliases. It can be appreciated that graphical buttons 640 are optional. In alternative possible implementations, the functions of graphical buttons 640 may be implemented through traditional menu selections or the functions of graphical buttons 640 may be omitted (e.g., graphical aliases may always be displayed).

Graphical aliases, such as graphical alias 635, may allow a user to quickly access or navigate to the various views of a model (act 520). In one implementation, selecting (e.g., double-clicking) alias 635 may cause the current window to update to the model window that contains the block for which the alias was created. For example, selecting alias 635 may cause the window to change to model window 412 (FIG. 4C), which includes the block (slider gain block 458) referred to by alias 635. In alternative implementations, actions other than double-clicking a graphical alias may cause the current window to update to the model window that contains the block for which the alias was created, such as ctrl+clicking, alt+clicking, or various alternative or user-defined keyboard shortcuts. Further, in another possible implementation, a user may select a block and graphically "drag" it over an alias. This action may cause the block to be copied or moved into the model window corresponding to the alias which allows simultaneous navigation and editing of the model.

Figure 7:
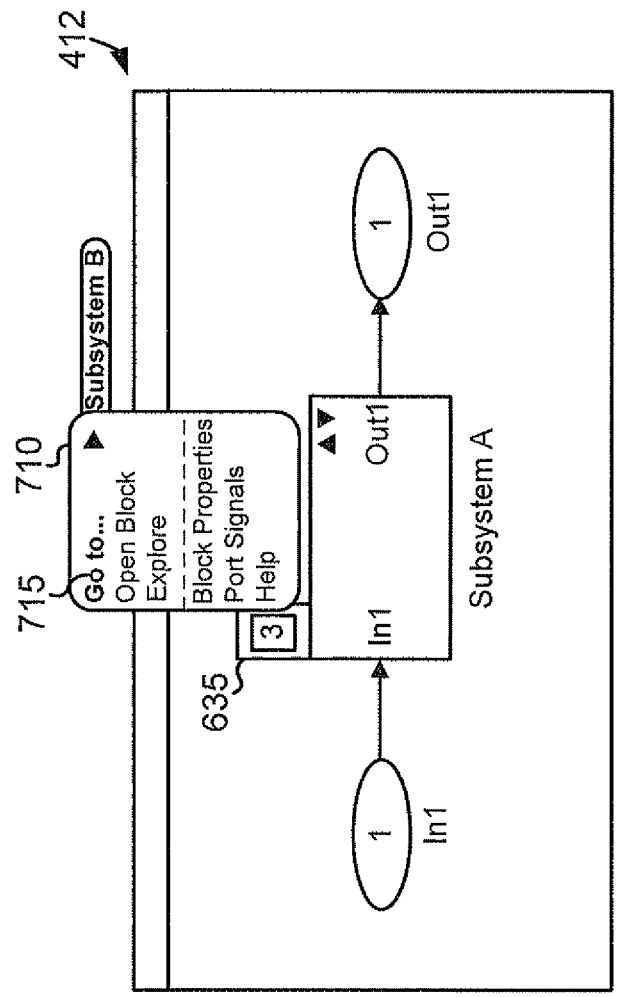
FIG. 7 is a diagram illustrating an exemplary user interface through which a user may modify or otherwise interact with a block in a model based on an alias.

FIG. 7 is a diagram illustrating an exemplary user interface through which a user may modify or otherwise interact with blocks based on an alias, as performed in acts 520 and 525 (FIG. 5). As shown in FIG. 7, graphical alias 635 is shown in subsystem A. As previously mentioned, graphical alias 635 refers to slider gain block 458. The user may select graphical alias 635 in a number of ways, such as by using a mouse to single or double-click alias 635. In response, a menu for the graphical alias may be shown. An exemplary menu 710 for graphical alias 635 is shown in FIG. 7.

Menu 710 may include an option to navigate to another portion of the model. In FIG. 7, "Go to . . . " menu item 715 may take the user to subsystem B, i.e., the portion of the model that contains slider gain block 458. In some implementations, "Go to . . . " menu 715 may include additional locations from which the user may select. In one implementation, the possible selections displayed in "Go to . . . " menu item 715 may be generated by alias management tool 325 based on a number of factors. The factors may include, for example, the location of the block (e.g., slider gain block 458) in the hierarchy of the model and/or the location of the alias; the type and properties of the block; global rules configurable by the user; and/or local rules which may override global rules for certain user-specified subsystems/blocks. For example, instead of showing only the location of the underlying block in "Go to . . . " menu item 715, the locations of other slider gain blocks in the model may also be shown. As another example, instead of showing only the location of the underlying block in "Go to . . . " menu item 715, the locations of all intermediate model windows may also be included in "Go to . . . " menu item 715.

In addition to using aliases to quickly navigate through various portions of a model, in some implementations, graphical aliases may be used to modify properties of a block without requiring the user to navigate to the portion of the model that contains the block.

Menu 710 may additionally include all or substantially all of the items that would normally be shown if the user accessed the contextual menu for the underlying block (i.e., slider gain block 458). In other words, menu 710 may be similar to the contextual menu associated with the underlying block (i.e., contextual menu 610, shown in FIG. 6A). For example, menu 710 may include options to open the block, navigate to its reference if it is, for example, a library block, view the properties of the block, change port signals associated with the block, or obtain help relating to the block. Changes made via these menu selections may be applied directly to the underlying block. In this manner, a user can modify properties of a block without actually having to navigate to the block.

In some implementations, the properties that are available for modification through the alias may be a subset (possibly user configurable) of the available properties or even a superset of the available properties. As another example, a single alias may refer to multiple blocks or aspects of the blocks. For example, a single alias, when selected, may allow the user to modify properties of multiple blocks.

Further, in some implementations, the menu or dialog for a block may itself include aliases. In other words, the menu/dialog for a block may be configured to include an alias. In this situation, the alias may be displayed in the menu/dialog for a block instead of (or in addition to) in the model block window.

As an example of modifying a block via its alias, consider menu 710 for alias 635, as shown in FIG. 7. Assume the user selects "Block Properties" from contextual menu 710. This may cause another dialog window to be shown to the user on top of model window 412. The new dialog window may include the user-settable properties for the block corresponding to alias 635. Changing these properties in this window may then be reflected in the block to which the alias refers.

Figure 8:
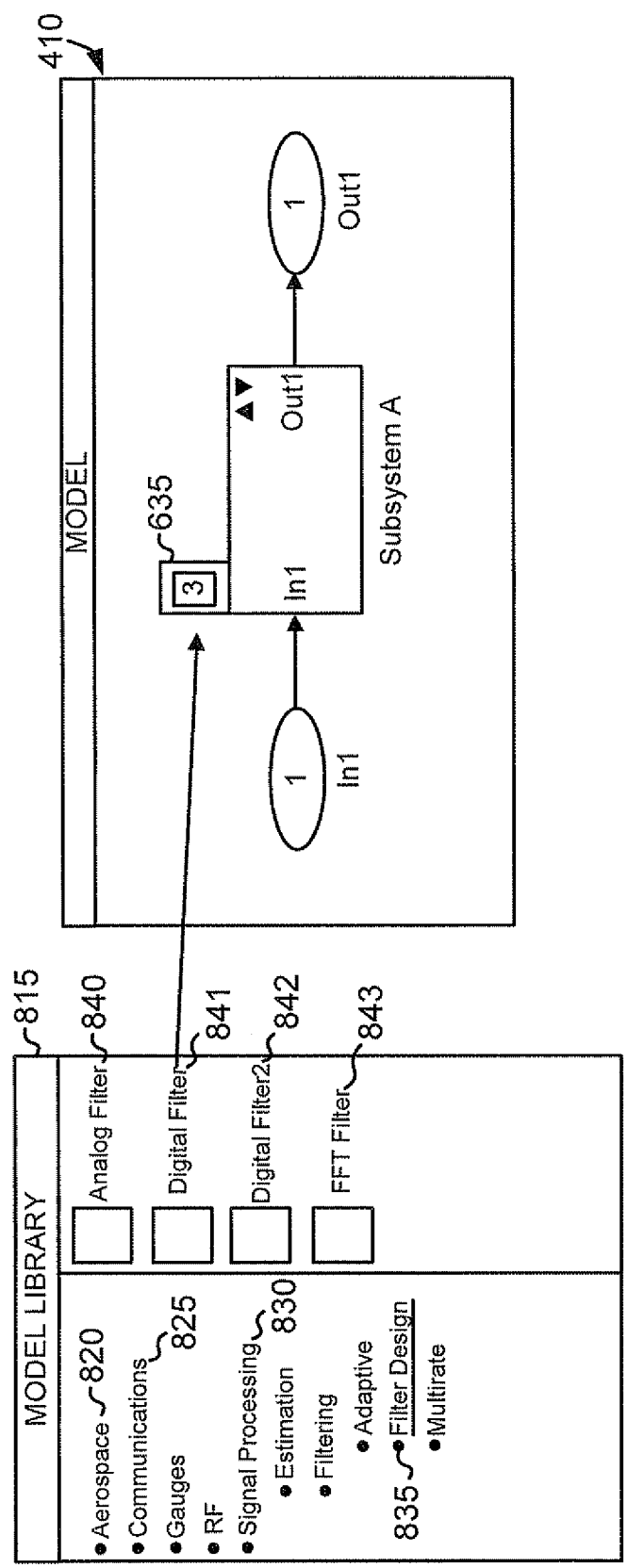
FIG. 8 is a diagram illustrating an exemplary user interface through which a user may replace or remove a block based on manipulation of its graphical alias.

In addition to using a graphical alias to navigate a model and modify the properties of a block, in some implementations, a block may be, based on its alias, fully replaced or removed from a model. FIG. 8 is a diagram illustrating an exemplary user interface through which a user may replace or remove a block based on manipulation of its graphical alias (act 530 in FIG. 5).

Graphical model component 320, in addition to presenting model windows, such as model windows 410-414, may also include block libraries that may be user defined. An exemplary library 815 is shown in FIG. 8. Library 815 may include one or more blocks having predefined functions. Each block in model library 815 may represent functionality and/or data and may be defined using any of a number of possible programming languages. The blocks in library 815 may be grouped by category. A number of categories are shown in FIG. 8, including aerospace category 820, communications category 825, and signal processing category 830.

These categories may include sub-categories. Signal processing category 830 is particularly shown as including an "estimation" sub-category and a "filtering" sub-category. The "filtering" sub-category further includes a "filter design" sub-category 835. Filter design sub-category 835 is shown as being selected and including a number of model blocks 840-843, named "analog filter," "digital filter," "digital filter2," and "FFT filter" respectively.

Assume that the user would like to replace slider gain block 458 with digital filter block 841. Consistent with aspects described herein, the user may replace slider gain block 458 with digital filter block 841 by dragging digital filter block 841 from library 815 onto alias 635. In this manner, the user does not need to first navigate to model window 412 (the window that includes slider gain block 458) before replacing slider gain block 458. Likewise, if the block is a configurable subsystem the content of which may be configured, for example, based on selecting it from a labeled set, the particular configuration that is currently selected may be accessible from an alias.

In addition to replacing a block (through its alias) with a block from a model library, a block may be replaced with a block from other sources, such as with another block from the model or another block from another portion of the model. For example, the user may replace slider gain block 458 with another block selected from the model or from another model.

In addition to replacing blocks using the alias associated with a block, in some implementations, an alias may be used to delete the underlying block. For example, to delete slider gain block 458, a user may select and delete the alias associated with the block (e.g., alias 635 in FIG. 6B). In response, graphical model component 320 may delete the underlying block (i.e., the block to which the alias refers) as well as the alias. In some implementations, when deleting an alias, the user may be given an option of deleting just the alias or both the alias and the underlying block. Furthermore, in one implementation, when the user chooses to delete the underlying block based on deletion of an alias, graphical model component 320, depending on a user configurable setting or explicit selection, may delete the block and leave the connections to/from the block unconnected or delete the block and link the connections to/from the block to the next blocks in the model.

Referring back to FIG. 5, users may also delete aliases for a block. Users may delete an alias by, for example, selecting the alias or selecting the block to which aliases are associated. Alias management tool 325 may provide users with the option of deleting all aliases associated with a block or deleting one or more aliases associated with the block.

Additionally, in some implementations, aliases may be "copied" or "cut" and pasted elsewhere in the model. In this situation, the pasted alias may automatically be associated with a block in the new hierarchical structure where it was pasted. The new block to which the alias is associated may be automatically determined based on, for example, the new block having the same or similar name as the original block, the new block having the same type as the original block, the new block having the same functional attributes as the original block (e.g., sample time, number of input, number of output, dimension of input, dimension of output), the new block having the same tag as the original block, the new block having the same hierarchical path from the alias to the original block, the new block having the same author or author group as the original block, etc.

The implementation of alias management tool 325 may require changes to the computer code that is used to implement the blocks in the model. For example, if using C++ to implement some or all of the blocks in a model, blocks may be defined as classes. The code for the classes may be modified based on the graphical aliases so that the class interfaces include interfaces to the original blocks for which the alias is defined. In this manner, humans viewing the generated code (e.g., the generated C++ code) corresponding to the model or other programs interacting with the code may see an interface that corresponds to the interface presented by the graphical version of the model.

As an example of changing the computer code that is used to implement the blocks in a model, consider the example in which GME 120 generates a C++ class to implement subsystem A 430. The declaration for the class may resemble the code shown in Table I. In this situation, C++ code outside the class cannot read or change the value of the private variable gain, which may correspond to gain block 466 (FIG. 4E). Now assume that a graphical alias is defined for gain block 466, where the alias is placed in subsystem A. In this case, GME 120 may modify the C++ class to allow code outside the class to read or change the value of gain block 466. An example of such a modified version of the code for subsystem A is shown in Table II.

TABLE I

```
class SubsystemA
{
  private:
    ...
    double gain;    // Corresponding to the value of gain block 466
    ...
  public:
    ...
    void process(void);    // Some function that uses the variable gain
    ...
};
```

TABLE II

```
class SubsystemA
{
  private:
    ...
    double gain; // Corresponding to the value of the gain block 466
    ...
  public:
    ...
    void set_gain(double x);    // Function related to the alias
    double get_gain(void);      // Function related to the graphical alias
    void process(void);         // Some function that uses the variable gain
    ...
};
```

The code modified or generated by GME 120 may, in some implementations, be code designed to be used in an environment in which software is provided as a service. Software as a Service ("SaaS") is a model of software deployment in which an application is hosted as a service provided to customers across a network such as the Internet. For example, the code modified or generated by GME 120 may be run as part of graphical modeling environment service 160 (FIG. 1). In this software as a service model of software deployment, the need to install and run the graphical modeling environment on the customer's own computer can be eliminated.

In some implementations, it may be desirable to make different hierarchical levels of a model not logically visible to other levels of the model. In other words, variables or processes in the model may be assigned different variable scopes. For example, blocks in a subsystem may not be able to normally access blocks in other subsystems that are on different branches of the hierarchical structure of the model (e.g., blocks in subsystem C 457 may not normally be able to access blocks in subsystem D 453). Enforcing this type of compartmentalization between blocks can be useful to simplify model design and reduce the occurrence of logical errors in a model. A graphical alias, however, may be used as a way to selectively circumvent this restriction on the ability of blocks to access other blocks.

As an example of using aliases to allow blocks to interact with blocks in other model hierarchical subsystems that would not be visible to each other, consider data store read block 468 (FIG. 4E, subsystem C) and data store memory 462 (FIG. 4D, subsystem D). Data store read block 468 may not be able to read from data store memory 462 as these blocks are in different subsystems that are not visible to one another. By providing an alias in subsystem A that refers back to data store memory 462 in subsystem D, alias management tool 325 may provide for a method through which data store read block 468 can read from data store memory 462. Because the rules governing scope in the model may make subsystem A visible to blocks in subsystem C, and because in subsystem A there is an alias referring to the data store memory 462 in subsystem D, the data store read block 468 may be able to read from data store memory 462.

As another example, assume a user places an alias in subsystem D 453, where the alias refers to a block in subsystem C 457. Other blocks in subsystem D 453 may then access the properties of the block in subsystem C 457 through its alias (which is in subsystem D 453). In this manner, alias management tool 325 may be used to be able to access blocks in different parts of a model hierarchy that would not normally be visible to the accessing blocks. Here, the alias does not modify the functionality of a node but yet provides a simple technique, from the user's perspective, of changing the visibility of different branches of the hierarchical model subsystem. As another example, an alias may be placed in subsystem C 457 to give blocks in subsystem A 430 access to the subsystem C 457.

In some implementations, it may additionally be possible for a user to designate subsystems of a model as "private" or "locked." By designating a subsystem as locked, TCE 120 may not allow non-authorized users to view the contents of the subsystem. In this situation, however, aliases may be used to provide limited access to a locked subsystem. For example, assume a user designates subsystem C 457 as a locked subsystem but places an alias in subsystem B 452 to block 466, which is in subsystem C 457. Other users, who may be unable to view subsystem C 457, may nonetheless still be able to interact with block 466 in subsystem C 453 via the alias in subsystem B 452. In this manner, an alias can be used to provide controlled access to subsystems in a model. In some implementations, an aliases may be used to "skip" a subsystem and provide access to an even lower subsystem in the hierarchy (without providing access to the subsystem that is skipped). For example, assume that subsystem B 452 is locked. An alias placed in subsystem A 430 and that refers to a block in subsystem C 457 may still allow users to access subsystem C 457. Additionally, in some implementations, an alias may allow either a single block in a subsystem or the whole subsystem to be accessed. For instance, in the preceding example, whether the aliases that refers to a block in subsystem C 457 allows access to all of the blocks in subsystem C 457 or just to the block associated with the alias may depend on whether subsystem C 457 is locked.

Additionally, in some implementations, an alias defined for a block in a locked subsystem may be defined to only allow certain types of access, such as an alias that only allows navigation to its block or an alias that allows modifying of the block properties but not navigating to the block. The access restrictions associated with an alias may be user dependent. For instance, for some users, the alias may allow the users to navigate to a block and for other users it may allow navigation and modification of the block.

The concepts described above were generally described as applicable for use in graphical modeling environments. An example of an applicable graphical modeling environment includes the Simulink® environment, available from The MathWorks. Simulink® is an environment for multidomain simulation and model-based design for dynamic and embedded systems. The concepts described herein may also be applied to extensions to Simulink®, such as Stateflow®, SimEvents®, SimMechanics® and Simscape®, also available from The MathWorks. Stateflow® is generally a tool for state machine modeling using state transition diagrams with hierarchy, graphical functions, truth tables, and an action language. SimEvents® is generally a tool for discrete event modeling that diagrammatically capture the flow of entities in a network of operations. SimMechanics® is generally a tool for modeling three-dimensional mechanical systems, including automatic inference of computational causality. Simscape® is generally a tool for modeling systems spanning mechanical, electrical, hydraulic, and other physical domains as physical networks.

The concepts described herein may also be applied in environments based on the the Unified Modeling Language (UML) specification, environments based on a hardware description language (HDL), or an environment based on a system description language, such as SystemC.

CONCLUSION

Techniques were described herein for assigning and displaying graphical indicators, called alias, to a block or node in a graphical model. The graphical alias may be displayed in hierarchical levels of the model other than the level in which the underlying block is present. A user may perform a number of possible operations on the alias, such as navigating to the underlying block, modifying the underlying block, replacing the underlying block, or deleting the underlying block.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be modified in other implementations. Further, non-dependent acts may be performed in parallel.

Also, the term "user" has been used herein. The term "user" is intended to be broadly interpreted to include, for example, a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, within a graphical modeling environment, a first portion of a model of a system for display in a first graphical view of the model,
       the providing the first portion of the model for display being performed by one or more processors of a device;
   associating an alias with the first portion of the model,
       the alias not modifying a functionality of the first portion of the model when the model is executed,
       the alias including a thumbnail version of the first portion of the model, and
       the associating the alias with the first portion of the model being performed by the one or more processors;
   providing the alias and a second portion of the model for display in a second graphical view of the model,
       the second portion of the model being different from the first portion of the model, and
       the providing the alias and the second portion of the model for display being performed by the one or more processors;
   detecting an input related to the alias in the second graphical view of the model,
       the detecting the input being performed by the one or more processors; and
   performing an operation related to the first portion of the model based on the input,
       the operation being performed by the one or more processors and while the alias is displayed in the second graphical view of the model.

2. The method of claim 1, where the performing the operation includes:
   providing an output of the second portion of the model to the first portion of the model.

3. The method of claim 1, where the performing the operation includes:
   providing the first portion of the model for display in the first graphical view of the model based on the input.

4. The method of claim 1, where the performing the operation includes:
   removing a node from the first portion of the model, and
   inserting another node into the first portion of the model,
       the other node being selected from one of:
           a model library, or
           another model.

5. The method of claim 1,
   where the first portion of the model includes a first object of the model; and
   where the performing the operation includes:
       modifying a property of the first object based on the input.

6. The method of claim 1, further comprising:
   providing the alias and a third portion of the model for display in a third graphical view of the model,
       the third portion of the model being different from the first portion of the model and the second portion of the model;
   detecting a second input,
       the second input being related to a display of the alias in the third graphical view of the model; and
   performing another operation related to the first portion of the model based on the second input.

7. The method of claim 1,
   where a node, of the first portion of the model, generates a signal, and
   where the performing the operation includes:
       presenting, based on the input, information identifying one or more properties of the signal for display in the second graphical view of the model.

8. A device comprising:
   one or more processors to:
       provide a graphical modeling environment used to facilitate construction of a model of a system,
           the model including a plurality of nodes,
       present a first node, of the plurality of nodes, for display in a first graphical view of the model,
       associate the first node with an alias, the alias comprising a thumbnail version of the first
node, and
the alias not modifying a functionality of the first node
when the model is executed,
present the alias for display in a second graphical view of
the model,
the first node not being displayed in the second
graphical view, and
the second graphical view being different from the
first graphical view,
detect an interaction with the alias in the second graphical
view of the model, and perform an operation related to
the first node based on the detected interaction,
the operation being performed while the alias is displayed in the second graphical view of the model.

9. The device of claim 8,
where the first node generates a signal comprising one or
more signal properties,
the one or more signal properties including at least one
of:
a data type associated with the signal,
a sample rate associated with the signal,
a complexity associated with the signal,
a computational causality associated with the signal,
or
a dimensionality associated with the signal, and
where, when performing the operation, the one or more
processors are to:
present, based on the detected interaction, information
identifying the signal properties for display in the
second graphical view of the model.

10. The device of claim 8,
where the first node is included in a subsystem of the
model,
where, when presenting the first node for display, the one or
more processors are to:
present the subsystem for display in the first graphical
view of the model, and
where, when performing the operation, the one or more
processors are to:
provide access to the subsystem based on the detected
interaction.

11. The device of claim 10, where, when providing access
to the subsystem, the one or more processors are to:
present the subsystem for display in the first graphical view
of the model based on the detected interaction.

12. The device of claim 8,
where the plurality of nodes includes a plurality of first
nodes,
where, when presenting the first node for display, the one or
more processors are to:
present the plurality of first nodes for display in the first
graphical view of the model, and
where, when associating the first node with the alias, the
one or more processors are to:
associate each of the plurality of first nodes with a corresponding one of a plurality of aliases,
the plurality of aliases including the alias.

13. The device of claim 8, where, when performing the
operation, the one or more processors are to:
modify one or more properties of the first node based on the
detected interaction.

14. The device of claim 8, where, when performing the
operation, the one or more processors are to:
delete the first node from the model based on the detected
interaction.

15. One or more non-transitory computer-readable media
storing instructions, the instructions comprising:
one or more instructions, executable by at least one processor, to:
provide a graphical modeling environment used to
facilitate construction of a model of a system,
the model including a plurality of nodes,
provide a first group of nodes, of the plurality of nodes,
for display in a first graphical view of the model,
receive a selection of a first node of the first group of
nodes,
associate the first node with an alias based on the selection,
the alias not modifying a functionality of the first node
when the model is executed,
provide the alias, as a thumbnail representation of the first
node, and a second group of nodes, of the plurality of
nodes, for display in a second graphical view of the
model,
the second group of nodes being different from the first
group of nodes, detect an interaction with the alias in
the second graphical view of the model, and perform
an operation related to the first node based on the
detected interaction,
the operation being performed while the alias is displayed in the second graphical view of the model.

16. The one or more non-transitory computer-readable
media of claim 15, where the one or more instructions to
perform the operation include:
one or more instructions to delete the first node from the
first group of nodes based on the detected interaction.

17. The one or more non-transitory computer-readable
media of claim 15, where the one or more instructions to
perform the operation include:
one or more instructions to remove the first node from the
first group of nodes, and
one or more instructions to insert another node into the first
group of nodes,
the other node being selected from one of:
model library,
the plurality of nodes, or
another model.

18. The one or more non-transitory computer-readable
media of claim 15,
where the instructions further comprise:
one or more instructions to:
receive a selection of the first node in the first graphical view of the model,
provide, based on the selection of the first node, information identifying the second graphical view of the
model for display, and
receive, based on providing the information identifying the second graphical view of the model for
display, a selection of the second graphical view of
the model, and
where the one or more instructions to provide the alias and
the second group of nodes for display include:
one or more instructions to provide the alias and the
second group of nodes for display based on the selection of the second graphical view of the model.

19. The one or more non-transitory computer-readable
media of claim 15, where the one or more instructions to
provide the alias and the second group of nodes for display
include:
one or more instructions to set the alias for display in the
second graphical view of the model based on one or
more of:

a location of the first node in the model,
a type of the first node, or
a property of the first node.

20. The one or more non-transitory computer-readable media of claim 15, where the one or more instructions to perform the operation include:
one or more instructions to modify a property of the first node based on the detected interaction.

\* \* \* \* \*